May 23, 1933.  D. T. McKINNON  1,910,705
HEATING DEVICE
Filed Jan. 8, 1931
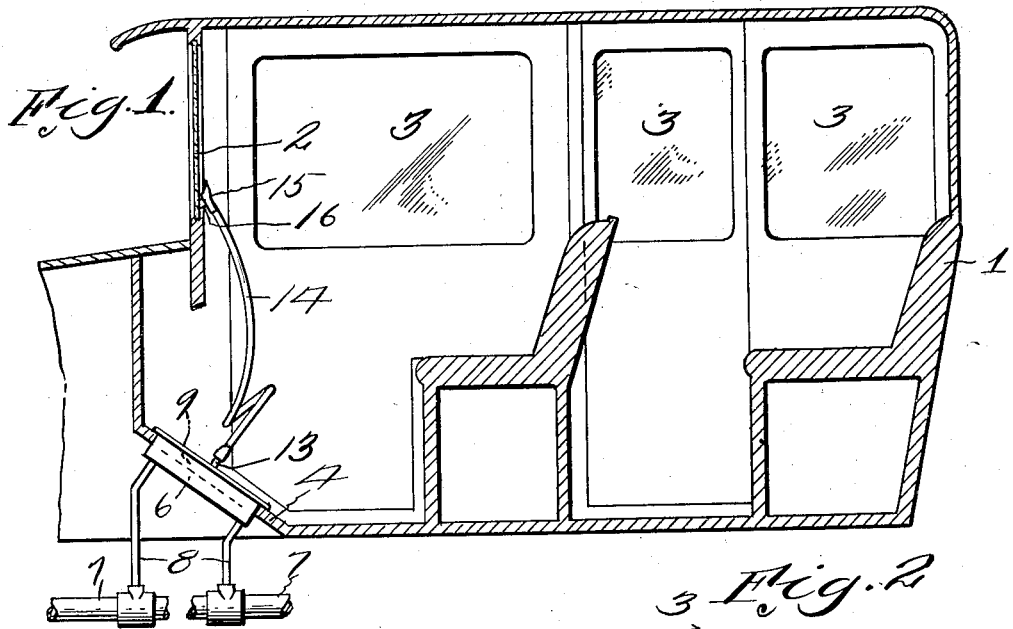
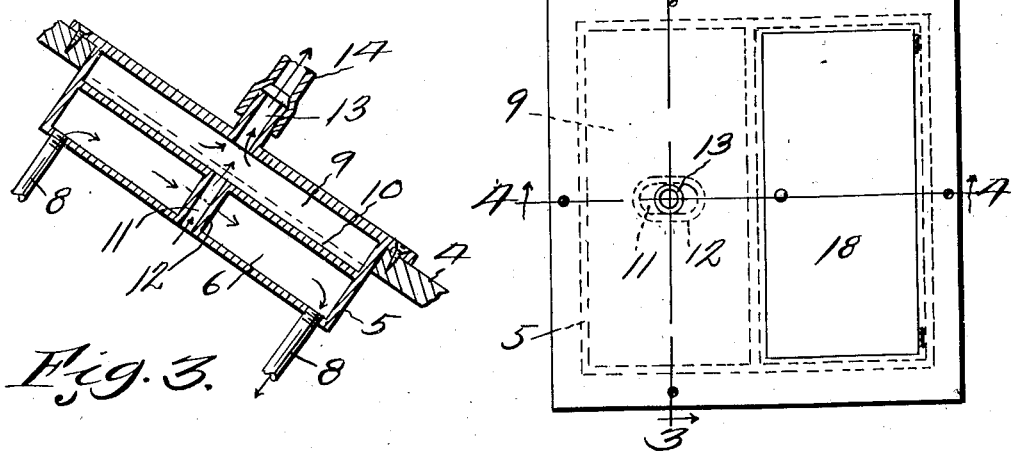
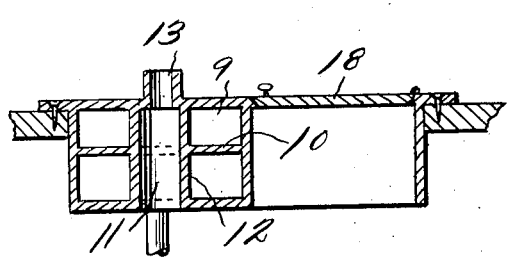
Fig. 4.
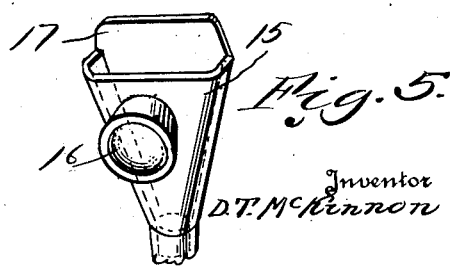
Fig. 5.
Inventor
D. T. McKinnon
By Philip A. Serrell
Attorney Patented May 23, 1933

1,910,705

UNITED STATES PATENT OFFICE

DOUGALD T. McKINNON, OF NORFOLK, NEBRASKA

HEATING DEVICE

Application filed January 8, 1931. Serial No. 507,464.

The invention relates to defrosting devices, and has for its object to provide a device of this character wherein air is conducted to and discharged against the windshield from the atmosphere outside the car and preheated before it is discharged against the windshield for defrosting purposes.

A further object is to provide means for preheating air before discharging the same against the windshield within an automobile, and means whereby air within the automobile will pass to the atmosphere thereby facilitating the defrosting operation.

A further object is to provide a casing having a chamber therein, through which exhaust gases pass for preheating air passing through the casing to a conduit leading to a discharge nozzle adjacent the windshield. Also to provide the casing with a closure, which when opened, will allow moist air to pass through the casing to the atmosphere outside the car, thereby facilitating the defrosting operation.

A further object is to provide a flexible pipe leading to the discharge nozzle, and of sufficient length whereby it may be positioned for discharging air onto any of the glass covered openings of the automobile for defrosting purposes.

A further object is to provide the nozzle, carried by the flexible pipe, with a suction cup whereby it may be attached in various positions on the windshield.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through the body of a conventional form of automobile, showing the device attached thereto.

Figure 2 is a top plan view of the casing.

Figure 3 is a vertical longitudinal sectional view through the casing, taken on line 3—3 of Figure 2.

Figure 4 is a vertical transverse sectional view taken on line 4—4 of Figure 2.

Figure 5 is a perspective view of the nozzle and its vacuum cup.

Referring to the drawing, the numeral 1 designates the body of a conventional form of automobile, 2 the windshield, and 3 side window glasses, all of which become frosted and obscure the vision of the operator of the car. This frosting is caused by the condensation of moisture within the car, and it is well known that air filled to the point of saturation at zero only contains one tenth the moisture the air will hold when heated to seventy degrees. The frost forms on the inside of the windshield and other glasses, and by keeping the dry hot air within the car free from contamination with the cold air until it is exhausted, and particularly the intake air, after it has been preheated, and until it is discharged against the windshield, the defrosting operation will be quick and positive.

Disposed in the bottom 4 of the body is a casing 5 having a chamber 6 in one side thereof and through which chamber the exhaust gases from the exhaust pipe 7 are by-passed through the pipe 8 for radiating heat into the upper chamber 9, through the wall 10 for preheating air passing through the intake passage 11, which is further preheated by the exhaust gases passing around the conduit 12, therefore it will be seen that the air is positively preheated before it is discharged through the extension 13 into the flexible pipe 14. The flexible pipe 14 is made sufficiently long whereby its nozzle 15 may be placed adjacent the windshield 2 or the side windows 3, according to which is desired to defrost.

Nozzle 15 is preferably provided with a vacuum suction cup 16, adapted to be utilized for supporting the nozzle in various positions on the windshield or side windows for the defrosting operation. The nozzle is preferably provided with a deflecting flange 17 for deflecting the hot dry air against the windshield. It will be noted that the confined heat will serve a double purpose, that is, melting the frost on the window or windshield and stimulating evaporation. When it is desired the device may be used as a heater for the car, or if desired the door 18 may be opened for ventilating purposes.

Although the exhaust gases are shown as utilized for heating purposes, it is to be understood that any other kind of a heating unit may be used, and applicant does not limit himself in this particular.

The invention having been set forth what is claimed as new and useful is:—

A vehicle heating device comprising a rectangularly shaped casing adapted to be disposed in an inclined position in a floor opening, said casing having at one side thereof, an auxiliary casing having top, bottom and side walls, an inclined partition within the auxiliary casing, thereby forming upper and lower chambers, means for directing a heating medium longitudinally through the lower chamber, a conduit duct extending through the lower chamber, the lower wall and the partition and discharging into the upper chamber, a discharge opening carried by the upper wall in alinement with the fresh air duct and means whereby air may be by-passed through the casing to one side of the auxiliary casing.

In testimony whereof he hereunto affixes his signature.

DOUGALD T. McKINNON.